US008899548B2

(12) United States Patent
Hauk

(10) Patent No.: US 8,899,548 B2
(45) Date of Patent: Dec. 2, 2014

(54) VALVE DEVICE FOR A COMBUSTION ENGINE

(75) Inventor: Torsten Hauk, Neustadt (DE)

(73) Assignee: Illinois Tool Works Inc., Glenview, IL (US)

(*) Notice: Subject to any disclaimer, the term of this patent is extended or adjusted under 35 U.S.C. 154(b) by 286 days.

(21) Appl. No.: 13/375,861

(22) PCT Filed: May 11, 2010

(86) PCT No.: PCT/US2010/034326
§ 371 (c)(1),
(2), (4) Date: Dec. 2, 2011

(87) PCT Pub. No.: WO2010/141187
PCT Pub. Date: Dec. 9, 2010

(65) Prior Publication Data
US 2012/0085952 A1  Apr. 12, 2012

(30) Foreign Application Priority Data
Jun. 4, 2009 (DE) .......................... 10 2009 024 361

(51) Int. Cl.
*F16K 31/02* (2006.01)
*F16K 31/04* (2006.01)
*F16K 5/06* (2006.01)

(52) U.S. Cl.
CPC ............. *F16K 5/0647* (2013.01); *F16K 31/045* (2013.01)
USPC .......................... 251/81; 251/129.12; 251/288

(58) Field of Classification Search
CPC ........ F16K 31/045; F16K 31/048; F16K 5/07
USPC ................... 123/41.05–41.08, 41.13; 251/81, 251/129.11–129.13, 288
See application file for complete search history.

(56) References Cited

U.S. PATENT DOCUMENTS 3,988,891 A * 11/1976 Hoyler ............................ 251/81
4,296,913 A   10/1981 Hoyer
(Continued)

FOREIGN PATENT DOCUMENTS

CN    101220762 A    7/2008
DE    10207060 A1    8/2003
(Continued)

OTHER PUBLICATIONS

ISR for PCT/US2010/034326 dated Sep. 6, 2010.

*Primary Examiner* — Eric Keasel
(74) *Attorney, Agent, or Firm* — Lowe Hauptman & Ham LLP

(57) ABSTRACT

The invention relates to a valve device for a combustion engine, in particular of an automobile, comprising a housing with at least two fluid connections and a hollow valve element rotatable between at least two rotational positions via a valve shaft supported rotatably in the housing, which valve element comprises at least two openings, which, depending on the rotational position of the valve element, can be connected with the fluid connections of the housing, further comprising an electromotive drive with a drive shaft for rotating the valve element, the drive shaft and the valve shaft being connected via a coupling with one another. According to the invention, the coupling connects the drive shaft and the valve shaft torque-proof with one another up to a predetermined threshold torque and releases the torque-proof connection between the drive shaft and the valve shaft above the predetermined threshold torque, so that rotation of the valve shaft relative to the drive shaft is possible.

12 Claims, 4 Drawing Sheets

(56) References Cited

U.S. PATENT DOCUMENTS

| | | | |
|---|---|---|---|
| 4,427,177 A | 1/1984 | Constantinescu et al. | |
| 6,979,183 B2* | 12/2005 | Baumann | 417/407 |
| 7,052,428 B2* | 5/2006 | Bolz | 475/149 |
| 7,325,782 B2* | 2/2008 | Gebler et al. | 251/129.11 |
| 7,740,228 B2 | 6/2010 | Simpson et al. | |
| 2008/0035869 A1* | 2/2008 | Simpson et al. | 251/129.12 |
| 2009/0114169 A1* | 5/2009 | Heldberg et al. | 251/282 |

FOREIGN PATENT DOCUMENTS

| | | |
|---|---|---|
| EP | 1887200 A1 | 2/2008 |
| GB | 2024376 A | 1/1980 |

\* cited by examiner

VALVE DEVICE FOR A COMBUSTION ENGINE

RELATED APPLICATIONS

The present application is national phase of PCT/US2010/034326 filed May 11, 2010, and claims priority from German Application No. 10 2009 024 361.5 filed Jun. 4, 2009.

The invention relates to a valve device for a combustion engine, in particular of an automobile, comprising a housing with at least two fluid connections and a hollow valve element rotatable between at least two rotational positions via a valve shaft supported rotatably in the housing, which valve element comprises at least two openings, which, depending on the rotational position of the valve element, can be connected with the fluid connections of the housing, further comprising an electromotive drive with a drive shaft for rotating the valve element, the drive shaft and the valve shaft being connected via a coupling with one another. Such valve devices are used for example in the cooling circuits of automobile combustion engines. Multi-way valve elements are often provided for this purpose, suitable rotational positions thereof allowing cooling liquid to be fed from a cooling liquid supply for example to the engine block, a bypass or indeed a heating circuit of the vehicle. Such devices are known from DE 10 351 852 A1 or DE 10 2006 038 213 A1.

With such valve devices it is necessary to ensure that even if the electric motor fails, the engine block is supplied with cooling liquid, to prevent damage to the engine. Depending on the rotational position of the valve element, the latter has thus to be rotated into a flow position, in which it conveys cooling liquid to the engine block (fail-safe position). To this end, in the prior art a torque-proof coupling is provided between the drive shaft and the valve shaft, with a spring which is pretensioned such that it rotates the valve shaft and thus the valve element into the fail-safe position by its spring force in the event of failure of the electric motor. However, a disadvantage in this respect is that the electric motor has to work against the pretension of the spring in normal operation. In this way, energy losses arise and the motor accordingly has to be more powerful and thus bigger and more costly. In addition it is not possible to use inexpensive self-locking drives, since in the event of failure of the motor the drive shaft has to be rotated by the spring jointly with the valve shaft connected torque-proof therewith, in order to rotate the valve element into the flow position.

On the basis of the above-described prior art, the object of the invention is therefore to provide a valve device of the above-mentioned type which ensures a high level of operating reliability even in the event of failure of the drive and at the same time is inexpensive, energy-saving and of small structural size.

This object is achieved according to the invention by the subject matter of claim 1. Advantageous configurations may be found in the dependent claims, the description and the figures.

For a valve device of the above-mentioned type, the invention achieves the object in that the coupling connects the drive shaft and the valve shaft torque-proof with one another up to a predetermined threshold torque and releases the torque-proof connection between the drive shaft and the valve shaft above the predetermined threshold torque, so that rotation of the valve shaft relative to the drive shaft is possible.

The valve device may be provided in particular for a cooling water controller for the engine block of an automobile. The fluid may accordingly be a cooling liquid. The housing may also have more than two fluid connections, wherein the valve element may then also be rotatable between more than two rotational positions, in which different fluid connections may be connected together. The valve element is connected torque-proof, for example in one piece, with the valve shaft supported rotatably in the housing. To rotate the valve element an electric motor is provided, for example a d.c. motor, which, in normal operation, by way of its drive shaft and the coupling rotates the valve shaft and thus the valve element in the desired manner between the rotational positions thereof. The drive shaft and the valve shaft may be oriented coaxially to one another. They are connected torque-proof with one another up to the threshold torque. According to the invention, above the threshold torque this torque-proof coupling connection between the drive shaft and the valve shaft is released, however, such that the valve shaft and thus the valve element may nevertheless be rotated in the event of failure of the motor and thus for example immobility of the drive shaft. It is possible for a connection between the drive shaft and the valve shaft to continue to exist even above the threshold torque but it is no longer torque-proof, instead allowing relative rotation between the shafts.

Depending on the rotational position of the valve shaft relative to the drive shaft, the coupling may for example allow precisely one direction of rotation of the valve shaft above the threshold torque. The coupling may thus allow precisely one turn of the valve shaft in the event of a closed valve element, thus for example if the fluid connections of the housing are not connected by the valve element, such that the valve element is rotated into its flow position, in which it connects the fluid connections of the housing so as to convey fluid in a suitable manner. The valve element may thus be rotated into the "fail-safe" position. In this way, even in the event of failure of the electromotive drive it is ensured that, for example, cooling water can be passed through the valve device to an engine block of an automobile, damage to the engine by overheating thus being reliably prevented.

According to the invention a function similar to a sliding clutch is thus achieved, wherein reversible relative rotation between valve element and drive is allowed above the threshold torque. The threshold torque may amount for example to approximately twice the rated load torque of the electric motor. It is furthermore possible for relative movement between valve shaft and drive shaft to be allowed above the threshold torque only within a limited angular range, for example in an angular range such that the valve element is rotated precisely out of its closed position into the flow position. In principle, however, complete decoupling of the shafts above the threshold torque is also possible, such that any desired relative rotation between the shafts is allowed.

The invention allows the electric motor to be of smaller size, since it no longer has to work against the pretension of a spring. In this respect, the drive is more compact, less expensive and at the same time saves energy. Inexpensive, self-locking electromotive drives may also be used, since, through decoupling of the valve shaft from the drive shaft, the fail-safe position may also be adopted when the motor drive shaft is not rotating.

According to a particularly practical configuration, the valve element may be ball shaped. The valve element is thus a ball valve, in particular in the form of a segment of a hollow ball. According to a further configuration, the coupling may comprise a spring, wherein the spring connects the drive shaft and the valve shaft torque-proof with each other up to the threshold torque and twists above the threshold torque and thus allows rotation of the valve shaft relative to the drive shaft. The spring may in particular be a helical spring torsionally loaded about its longitudinal axis, for example a cylindrical helical spring. At its one end the spring is connected with the drive shaft and at its other end with the valve shaft. Above the threshold torque the spring twists on itself and thus allows relative rotational movement between the drive shaft and the valve shaft. Below the threshold torque, on the other hand, the spring substantially does not twist, so ensuring torque-proof connection. With this configuration the coupling function according to the invention is achieved particularly simply.

A particularly robust structure is possible if the coupling is a claw coupling, which allows relative rotation between the valve shaft and the drive shaft above the threshold torque. Above the threshold torque, the claw coupling may, in the event of twisting of a coupling spring which may be provided, allow precisely such relative rotation that the valve element may be rotated in the event of failure of the drive into the flow position, in which its openings suitably connect together the fluid connections of the housing. The claws are thus configured such that, depending on the rotational position of the shafts relative to one another, there is no form-fit between the claws at least in one direction of rotation.

According to a further configuration, the drive shaft may comprise a half-cylindrical projection in the area of its connection to the valve shaft and the valve shaft may comprise a quarter-cylindrical projection in the area of its connection to the drive shaft, wherein the half-cylindrical projection and the quarter-cylindrical projection engage each other so that the valve shaft can be rotated by 90° in relation to the drive shaft above the threshold torque. At least one of the projections may be arranged for example in a hollow cylindrical shank, wherein the other projection is arranged on a flange or the like, which engages in the shank, such that the projections also engage in one another and thus together form a 270° cylinder. The projections thus allow 90° rotation of the valve shaft relative to the drive shaft. For example, a coupling spring which may be provided prevents such rotation up to the threshold torque. Above the threshold torque the spring then twists, such that the 90° rotation is possible. The projections may in this case be oriented relative to one another in such a way that they allow rotation in the closed valve position precisely in a direction of rotation in which the valve shaft and thus the valve element are rotated by 90° into the flow position thereof. In the kinematic reverse of this configuration, the valve shaft may comprise a half-cylindrical projection in the area of its connection to the drive shaft and the drive shaft may comprise a quarter-cylindrical projection in the area of its connection to the valve shaft, wherein the half-cylindrical projection and the quarter-cylindrical projection engage each other so that the valve shaft can be rotated by 90° in relation to the drive shaft above the threshold torque.

The valve device according to the invention may furthermore comprise an actuator engaging the valve shaft at least indirectly, which actuator can exert a torque on the valve shaft above the threshold torque. This, for example, allows rotation of the valve element into a rotational position in which the openings of the valve element are connected to the fluid connections of the housing. In this respect, the actuator may act on a suitable action point on the valve shaft, for example a projection, applying the necessary torque to the valve shaft in the event of failure of the electromotive drive in order to release the coupling between the drive and valve shafts and rotate the valve element into the fail-safe position.

One or more sensors may accordingly be associated with the actuator, which for example monitor the engine block temperature of the internal combustion engine and activate the actuator if a threshold temperature is exceeded, so as to ensure a supply of cooling water to the engine block. It is particularly simple, inexpensive and operationally reliable, however, for an expanding material element to be used as actuator, for example an expanding wax element. This expanding material element absorbs the engine block temperature. As with a thermostatic valve, heating of the expanding material element leads to expansion and thus to the application of torque to the valve shaft. The expanding material element thus ensures that, if a critical temperature is exceeded, for example due to failure of the electric motor, the necessary cooling water is automatically supplied to the engine block, without an additional sensor system or open- or closed-loop control system being needed.

An exemplary embodiment of the invention is explained in greater detail below with reference to schematic figures, in which:

FIG. 1 shows a valve device according to the invention in a perspective exploded representation, FIG. 2 is a perspective view of the drive of the valve device of FIG. 1, FIG. 3 is a perspective view of the valve element of the valve device of FIG. 1, FIG. 4 is a perspective view of the valve device according to the invention in a first operating position, FIG. 5 is a perspective view of the valve device according to the invention in a second operating position, and FIG. 6 is a perspective view of the valve device according to the invention in a third operating position.

Figure 1:
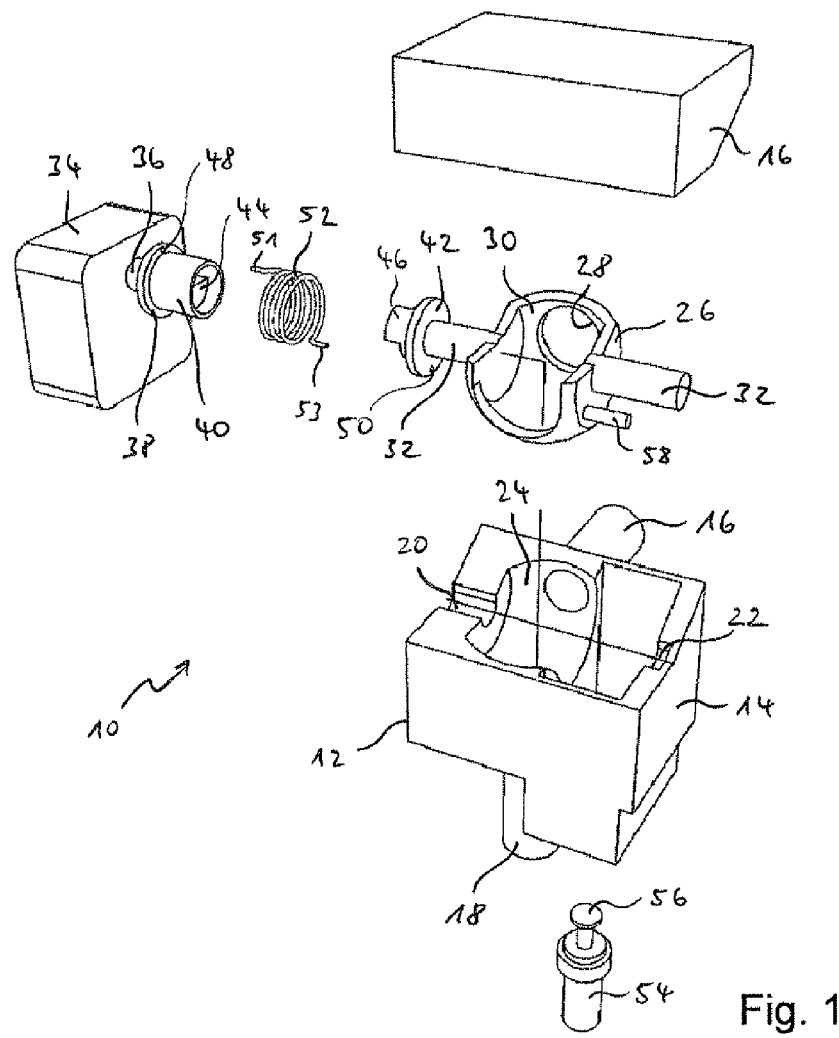

Unless otherwise indicated, in the figures the same reference numerals are used to denote the same items. FIG. 1 shows a valve device 10 according to the invention in a perspective exploded representation. Said valve device comprises a housing 12, which in the example shown comprises a lower housing half 14 and an upper housing half 16. On the lower housing half 14 two fluid connections 16, 18 are provided, one of which is in this case connected to a cooling liquid supply and the other to a feed line to an engine block, not shown, of an internal combustion engine of an automobile. In the example shown the valve device 10 is thus part of a cooling water controller for the engine block. On the lower housing half 14 two bearings 20, 22 are provided, together with a substantially spherical receptacle 24, which communicates with the fluid connections 16, 18 offset by 90° to one another and oriented perpendicularly to one another. The valve device 10 furthermore has a valve element 26 in the shape of a segment of a ball cup, which in the example shown comprises two openings 28, 30. The ball valve 26 is connected in one piece with a cylindrical valve shaft 32, which is interrupted by the cavity of the valve element 26. The valve element 26 may be inserted together with the valve shaft 32 into the housing 12, wherein the valve shaft 32 is rotatably supported on the bearings 20, 22 of the lower housing half 14 and the valve element 26 is accommodated in the receptacle 24. Depending on the rotational position of the valve shaft 32 and thus of the valve element 26, the fluid connections 16, 18 of the housing 12 may thus be connected together by the openings 28 and 30 of the valve element 26 or be cut off from one another, as is explained in greater detail below. It goes without saying that the upper housing half 16 comprises corresponding receptacles for the valve element 26 and the valve shaft 32.

The valve device 10 additionally has an electromotive drive 34, in this case a self-locking electrical d.c. motor 34. The d.c. motor 34 has a drive shaft 36, on which a hollow cylindrical shank 40 is arranged via a flange 38. As is visible in particular in the enlarged representation of FIG. 2, in the area of its connection to the valve shaft 32 the drive shaft 36 comprises a half-cylindrical projection 44 inside the hollow cylindrical stem 40. A flange 42 is likewise formed at the end of the valve shaft 32 associated in the assembled state with the drive shaft 36 of the motor 34. As is visible in the enlarged representation in FIG. 3, the valve shaft 32 has a quarter-cylindrical projection 46 arranged on the flange 42 at its connection to the drive shaft 36. In the assembled state of the valve device 10 the quarter-cylindrical projection 46 and the half-cylindrical projection 44 engage with one another and form a 270° cylinder segment. Furthermore, a bore 48 is provided in the flange 38 of the drive shaft 36. Such a bore 50 is likewise provided in the flange 42 of the valve shaft 32. In the assembled state a cylindrical helical spring 52 is secured in these bores 48, 50 in each case by one of its ends 51, 53, as is visible in FIGS. 4 to 6. In these figures the upper housing half 16 is not shown for the sake of clarity.

The valve device 10 according to the invention furthermore comprises an expanding material element 54, in this case an expanding wax element 54, which expands when exposed to heat. The expanding wax element is in thermal connection with the engine block of the vehicle. In the present example, heating of the expanding wax 54 results in raising of a pressure element 56 arranged on the top of the expanding wax element 54. The valve element 26 has a cylindrical projection 58 at its outer surface, with which the pressure element 56 of the expanding wax element 54 cooperates on expansion, as explained in greater detail below.

Figure 4:
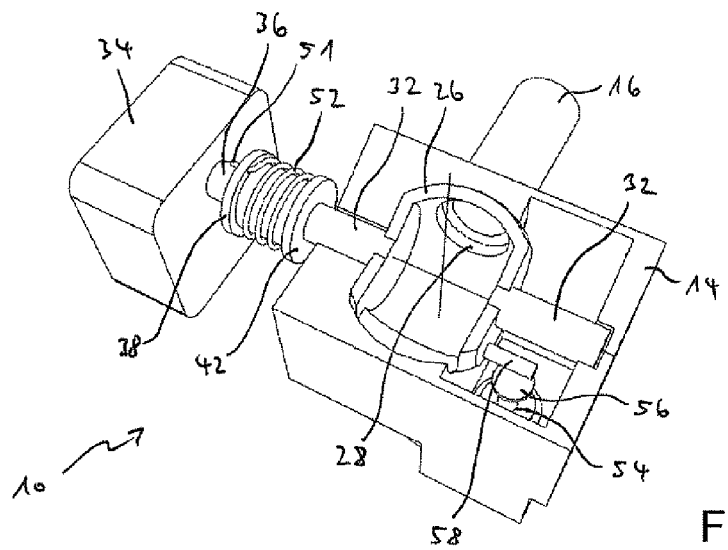
Figure 5:
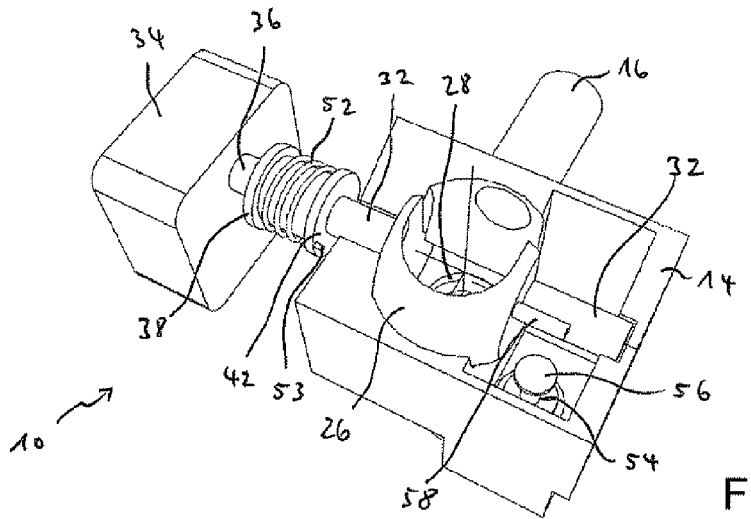

The functioning of the valve device according to the invention will be explained in greater detail below. FIG. 4 shows the valve device 10 according to the invention in the assembled state, wherein the valve element 26 is in a closed position, in which the fluid connections 16, 18 of the housing 12 are not connected together. In this position, therefore, no cooling liquid can flow from the cooling liquid supply to the engine block. In FIG. 5, on the other hand, the valve element 26 is in its flow position, in which the fluid connections 16, 18 of the housing 12 are connected together by means of the openings 28, 30 of the valve element 26. In this position cooling liquid thus flows from the cooling liquid supply to the engine block. Between the operating positions shown in FIGS. 4 and 5, the valve element 26 is rotated in normal operation by means of the electromotive drive 34. Up to a predetermined threshold torque, in the present case twice the rated load torque of the electric motor 34, the spring 52 produces a torque-proof connection between the drive shaft 36 of the motor 34 and the valve shaft 32 of the valve element 26. Rotation of the drive shaft 36 by the motor 34 accordingly brings about corresponding rotation of the valve shaft 32 and thus of the valve element 26, wherein the spring 52 does not substantially twist.

Figure 6:
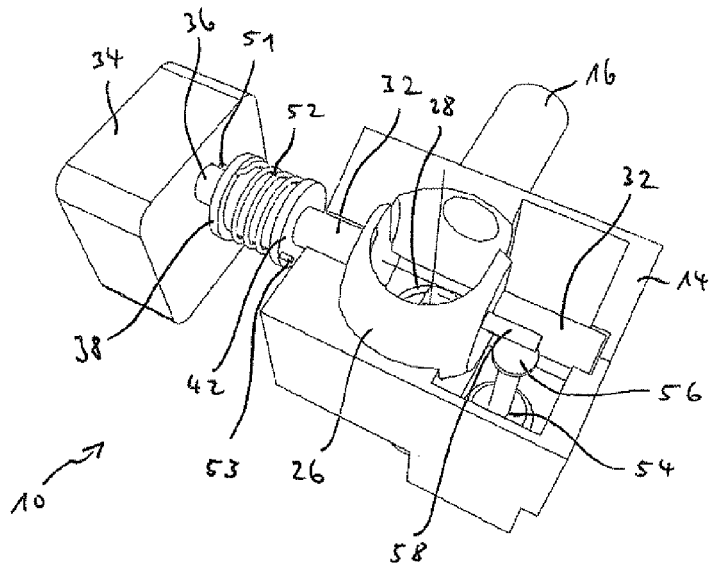

If, on the other hand, a torque is applied above the threshold torque for example to the valve shaft 32 and thus via the flange 42 to the spring 52, the spring 52 undergoes torsion and thus relative movement of the valve shaft 32 with regard to the drive shaft 36. If the valve element 26 is for example in the closed position shown in FIG. 4 and the electromotive drive 34 fails, first of all the temperature of the engine block will rise when in operation, since the latter is not supplied with cooling liquid. This leads in turn to expansion of the expanding material element 54 and thus to a raising of the pressure member 56 of the expanding material element 54. The pressure member 56 then exerts a torque on the valve element 26 via the projection 58 and thus on the valve shaft 32 connected torque-proof with said valve element which lies above the threshold torque. This torque is transmitted to the spring via the flange 42, such that said spring twists. Due to construction of the valve shaft 32 with a quarter-cylindrical projection 46 and the corresponding half-cylindrical projection 44 of the drive shaft 36, the valve shaft 32 and with it the valve element 26 are then rotated by precisely an angle of 90° into the flow position shown in FIG. 6 (fail-safe position), such that the fluid connections 16, 18 of the housing 12 are connected together via the openings 28, 30 of the valve element 26 and the engine block is supplied with cooling liquid. FIG. 6 shows the torsion of the spring 52 due to the relative movement of the valve shaft 32 relative to the, in this case, immobile drive shaft 36.

In this way the valve device 10 according to the invention ensures sufficient operating reliability of the combustion engine at all times even in the event of failure of the electromotive drive 34. At the same time, as a result of the coupling according to the invention the electric motor 34 may be smaller in size, is less expensive and saves energy. A self-locking drive may also be used, which further reduces costs.

Figure 2:
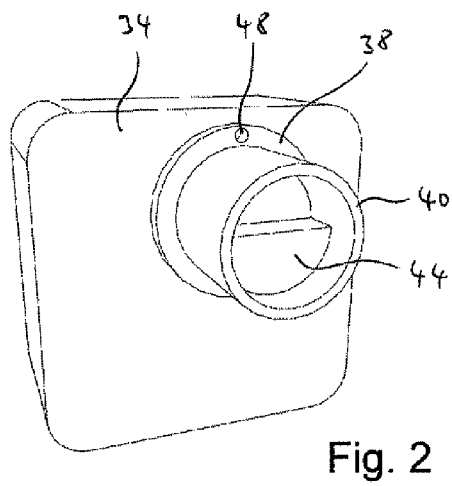
Figure 3:
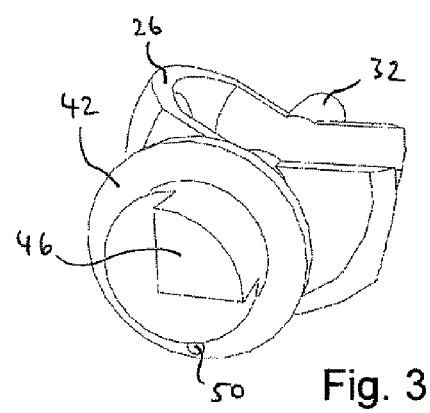
Figure 7:
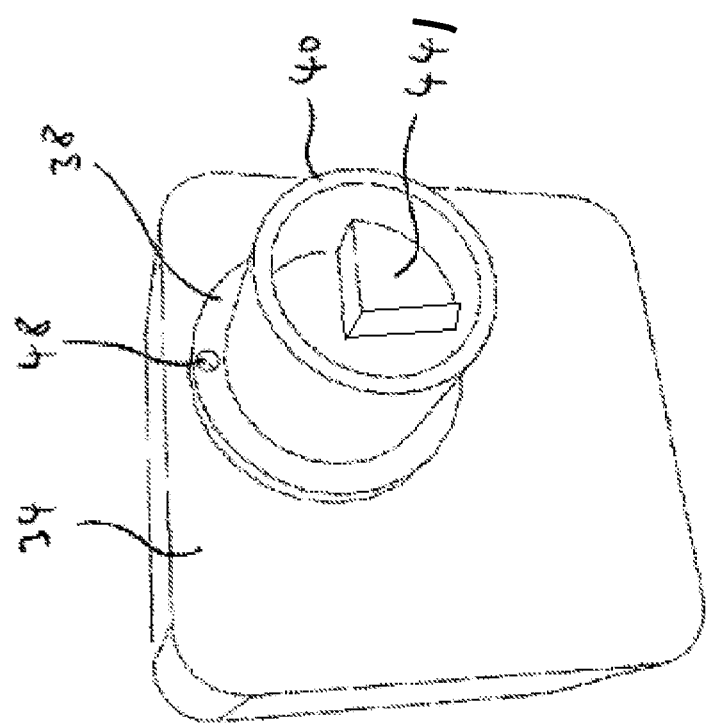
FIG. 7 is a perspective view of an alternate embodiment of an exemplary drive of an exemplary valve device.
Figure 8:
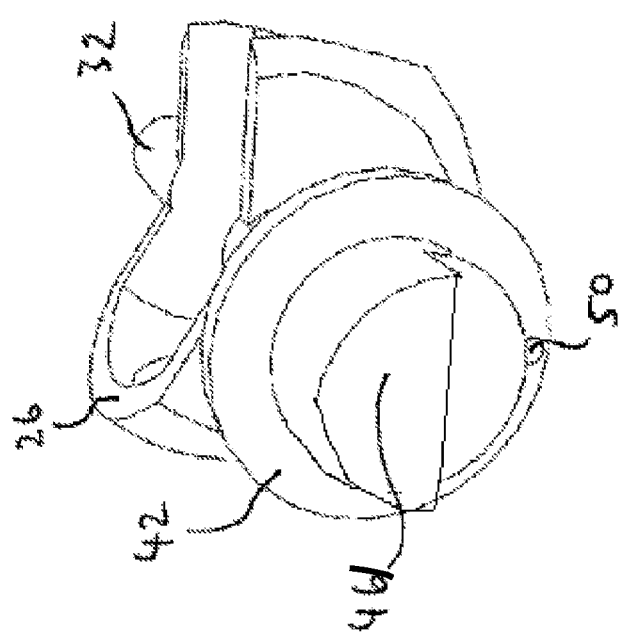
FIG. 8 is a perspective view of an exemplary valve element of an exemplary valve device.

FIGS. 7 and 8 depict an alternate embodiment, with like reference numbers of FIGS. 2 and 3 corresponding to those of these figures. As is visible in particular in the enlarged representation of FIG. 7, in the area of its connection to the valve shaft 32 the drive shaft 36 comprises a quarter-cylindrical projection 44 inside the hollow cylindrical stem 40. A flange 42 is likewise formed at the end of the valve shaft 32 associated in the assembled state with the drive shaft 36 of the motor 34. As is visible in the enlarged representation in FIG. 8, the valve shaft 32 has a half-cylindrical projection 46 arranged on the flange 42 at its connection to the drive shaft 36. In the assembled state of the valve device 10 the half-cylindrical projection 461 and the quarter-cylindrical projection 441 engage with one another and form a 270° cylinder segment.

The invention claimed is:

1. A device, comprising:
  a valve device for a combustion engine, including:
    a housing with at least two fluid connections and a hollow valve element rotatable between at least two rotational positions via a valve shaft supported rotatably in the housing, which valve element comprises at least two openings, which, depending on the rotational position of the valve element, can be connected with the fluid connections of the housing; and
    an electromotive drive with a drive shaft for rotating the valve element, the drive shaft and the valve shaft being connected via a coupling with one another, wherein
    the valve device is configured such that the coupling connects the drive shaft and the valve shaft with one another such that the connection between the drive shaft and the valve shaft is released above a predetermined threshold torque, so that rotation of the valve shaft relative to the drive shaft is possible,
  wherein the valve shaft comprises a half-cylindrical projection in the area of its connection to the drive shaft and in that the drive shaft comprises a quarter-cylindrical projection in the area of its connection to the valve shaft, wherein the half-cylindrical projection and the quarter-cylindrical projection engage with each other so that the valve shaft can be rotated by 90° in relation to the drive shaft above the threshold torque.

2. The valve device as claimed in claim 1, characterized in that the valve element is ball shaped.

3. The valve device as claimed in claim 1, characterized in that the coupling comprises a spring, wherein the spring connects the drive shaft and the valve shaft with each other up to the threshold torque and wherein the spring twists above the threshold torque and thus allows rotation of the valve shaft relative to the drive shaft.

4. The valve device as claimed in claim 1, characterized in that it comprises an actuator engaging the valve shaft at least indirectly, which actuator can exert a torque on the valve shaft above the threshold torque.

5. The valve device as claimed in claim 4, characterized in that the actuator is an expanding material element.

6. The valve device as claimed in claim 1, wherein the combustion engine is an internal combustion engine for an automobile.

7. A device, comprising:
   a valve device for a combustion engine, including:
      a housing with at least two fluid connections and a hollow valve element rotatable between at least two rotational positions via a valve shaft supported rotatably in the housing, which valve element comprises at least two openings, which, depending on the rotational position of the valve element, can be connected with the fluid connections of the housing; and
      an electromotive drive with a drive shaft for rotating the valve element, the drive shaft and the valve shaft being connected via a coupling with one another, wherein
   the valve device is configured such that the coupling connects the drive shaft and the valve shaft with one another such that the connection between the drive shaft and the valve shaft is released above a predetermined threshold torque, so that rotation of the valve shaft relative to the drive shaft is possible,
   wherein the drive shaft comprises a half-cylindrical projection in the area of its connection to the valve shaft and in that the valve shaft comprises a quarter-cylindrical projection in the area of its connection to the drive shaft, wherein the half-cylindrical projection and the quarter-cylindrical projection engage with each other so that the valve shaft can be rotated by 90° in relation to the drive shaft above the threshold torque.

8. The valve device as claimed in claim 7 wherein the valve element is ball shaped.

9. The valve device as claimed in claim 7 wherein the coupling comprises a spring, wherein the spring connects the drive shaft and the valve shaft with each other up to the threshold torque and wherein the spring twists above the threshold torque and thus allows rotation of the valve shaft relative to the drive shaft.

10. The valve device as claimed in claim 7 further comprising an actuator engaging the valve shaft at least indirectly, which actuator can exert a torque on the valve shaft above the threshold torque.

11. The valve device as claimed in claim 10 wherein the actuator is an expanding material element.

12. The valve device as claimed in claim 7 wherein the combustion engine is an internal combustion engine for an automobile.

* * * * *